United States Patent
Ito et al.

(10) Patent No.: US 10,850,387 B2
(45) Date of Patent: Dec. 1, 2020

(54) AUTOMATIC WORKPIECE TRANSFER MACHINE

(71) Applicant: FUJI CORPORATION, Chiryu (JP)

(72) Inventors: Takashi Ito, Toyota (JP); Takashi Nakane, Okazaki (JP); Atsushi Shimada, Toyota (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 16/332,928

(22) PCT Filed: Sep. 16, 2016

(86) PCT No.: PCT/JP2016/077373
§ 371 (c)(1),
(2) Date: Mar. 13, 2019

(87) PCT Pub. No.: WO2018/051476
PCT Pub. Date: Mar. 22, 2018

(65) Prior Publication Data
US 2019/0247997 A1 Aug. 15, 2019

(51) Int. Cl.
*B25J 5/02* (2006.01)
*B25J 9/00* (2006.01)
*B25J 9/04* (2006.01)

(52) U.S. Cl.
CPC ............... *B25J 5/02* (2013.01); *B25J 9/0084* (2013.01); *B25J 9/04* (2013.01)

(58) Field of Classification Search
CPC ............... B25J 5/02; B25J 9/0084; B25J 9/04
USPC ..................................................... 414/222.01
See application file for complete search history.

(56) References Cited

FOREIGN PATENT DOCUMENTS

| DE | 102005009283 A1 * | 8/2006 | ............ B25J 9/0096 |
|----|------|----|----|
| JP | 60-71548 U | 5/1985 | |
| JP | 5-201547 A | 8/1993 | |
| JP | 2010-155300 A | 7/2010 | |
| JP | 6501013 B1 * | 4/2019 | ............ B23Q 7/14 |

(Continued)

OTHER PUBLICATIONS

International Search Report dated Nov. 8, 2016 in PCT/JP2016/077373 filed on Sep. 16, 2016.

*Primary Examiner* — Saul Rodriguez
*Assistant Examiner* — Brendan P Tighe
(74) *Attorney, Agent, or Firm* — Oblon, McClelland, Maier & Neustadt, L.L.P.

(57) ABSTRACT

An automatic workpiece transfer machine including multiple conveyance robots configured to convey a workpiece with respect to multiple processing sections; and a control device configured to control driving of the conveyance robots, wherein the conveyance robots are provided with a transfer device configured to perform transfer of the workpiece between the processing sections, a traveling device configured to move the transfer device that is loaded on a traveling table with respect to the processing sections, and a workpiece holding device loaded on the traveling table and configured to hold the workpiece received from the transfer device, and the control device is provided with a workpiece transfer control section configured to, with respect to two adjacent of the conveyance robots, perform transfer of the workpiece between the transfer device of one of the two adjacent conveyance robots and the workpiece holding device of the other of the two adjacent conveyance robots.

5 Claims, 5 Drawing Sheets

(56) References Cited

FOREIGN PATENT DOCUMENTS

| JP | 2019155529 A | * | 9/2019 | ............. | B23Q 41/02 |
| WO | WO-2019176611 A1 | * | 9/2019 | ............. | B23Q 41/02 |

* cited by examiner

AUTOMATIC WORKPIECE TRANSFER MACHINE

TECHNICAL FIELD

The present application relates to an automatic workpiece transfer machine.

BACKGROUND ART

A processing machine line configured from multiple processing machines sends a workpiece in order between multiple processing machines arranged in a single line, and specified processing such as machining processing or measurement processing is performed. Patent literature 1 below discloses an automatic workpiece transfer machine for transferring a workpiece between processing machines. Specifically, the machine is a conveyance robot assembled to be movable in front of the processing machines. A conveyance rail is fixed to a front section of a base on which multiple processing machines are loaded, and a traveling table is provided on the conveyance rails in a movable manner, with a robot arm that performs transfer of the workpiece being loaded on the traveling table.

CITATION LIST

Patent Literature

Patent literature 1: JP-A-2010-155300

BRIEF SUMMARY

Technical Problem

To perform transfer of a workpiece between multiple processing machines, an automatic workpiece transfer machine is configured such that a conveyance robot is movable in a specified range. However, with a processing machine line with a large quantity of processing machines, it is necessary to increase the quantity of conveyance robots loaded on the automatic workpiece transfer machine. Therefore, when conveying a workpiece, it is necessary to perform transfer of the workpiece between conveyance robots, which requires time for workpiece transfer processing that is needed to synchronize the movements of each of the robots, thereby leading to a decrease in productivity. With respect to this point, by providing a temporary loading table for a workpiece at the processing machine line it is possible to perform work without one conveyance robot affecting another conveyance robot. However, space is required for such a temporary loading table for a workpiece, and because the quantity of temporary loading tables increases in accordance with the quantity of conveyance robots, the processing machine line overall becomes very large.

Thus, to solve the above problems, an object of the present disclosure is to provide an automatic workpiece transfer machine for performing transfer of a workpiece between conveyance robots with good efficiency.

Solution to Problem

An automatic workpiece transfer machine of an embodiment of the present disclosure includes: multiple conveyance robots configured to convey a workpiece with respect to multiple processing sections; and a control device configured to control driving of the conveyance robots, wherein the conveyance robots are provided with a transfer device configured to perform transfer of the workpiece between the processing sections, a traveling device configured to move the transfer device that is loaded on a traveling table with respect to the processing sections, and a workpiece holding device loaded on the traveling table and configured to hold the workpiece received from the transfer device, and the control device is provided with a workpiece transfer control section configured to, with respect to two adjacent of the conveyance robots, perform transfer of the workpiece between the transfer device of one of the two adjacent conveyance robots and the workpiece holding device of the other of the two adjacent conveyance robots.

Advantageous Effects

According to the present disclosure, with respect to two adjacent conveyance robots, because transfer of a workpiece is performed between a transfer device of one of the adjacent conveyance robots and a workpiece holding device of the other of the adjacent conveyance robots, the workpiece can be held at the workpiece holding device of one of the conveyance robots and the other conveyance robot can come and take the workpiece using the transfer device at a specific time, thus it is not necessary to synchronize movements when performing transfer of the workpiece, thereby transfer of the workpiece is performed efficiently.

DESCRIPTION OF EMBODIMENTS

Figure 1:
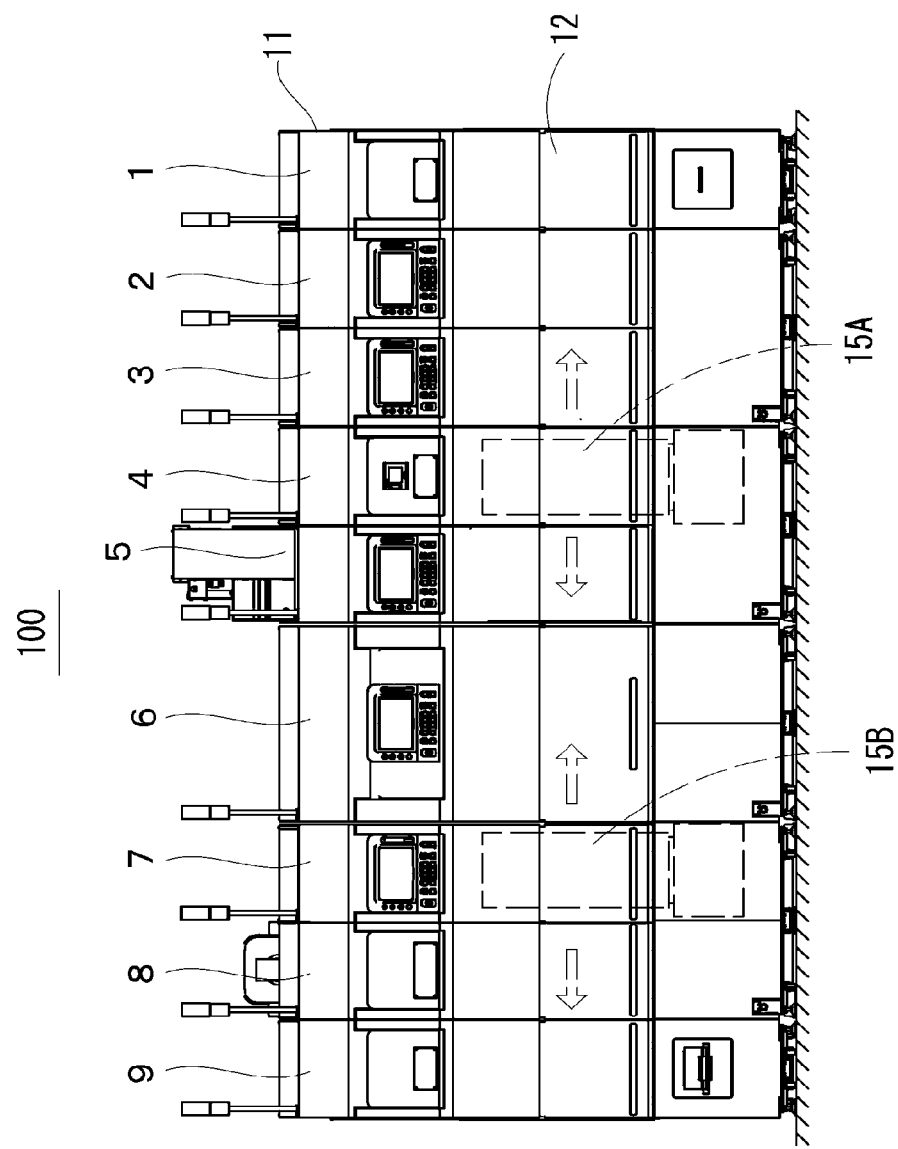
FIG. 1 is a front view of a processing machine line provided with an automatic workpiece transfer machine.

Hereinafter, an embodiment of the present disclosure of an automatic workpiece conveyance machine will be described with reference to the figures. FIG. 1 is a front view of a processing machine line provided with an automatic workpiece transfer machine. Processing machine line 100 is configured from various types of modules such as lathes, machining centers, or measurement machines lined up in a row between workpiece loading module 1 on the right end in the figure acting as a workpiece loading section and workpiece unloading module 9 at the left end in the figure. A workpiece loaded via workpiece loading module 1 is conveyed by an automatic workpiece transfer machine, various processes are performed on the workpiece at each module such as cutting processes at modules such as a lathe, and the workpiece is conveyed to workpiece unloading module 9 on the left in the figure.

Lathe modules 2 and 3 are set next to workpiece loading module 1, and measurement module 4 is set next in line. Thus, after first processing and second processing such as cutting or the like is performed on the workpiece at lathe modules 2 and 3, the dimensional accuracy of the processed workpiece is checked at measurement module 4. Then, next to measurement module 4, machining center module 5 such as a line boring or drilling machine is set to perform third processing on the workpiece. Then, next to machining center module 5, hob module 6 for performing gear cutting is set to perform fourth processing on the workpiece.

Then, next to hob module 6, deburring module 7 for removing burrs on the workpiece caused by previous processes is set, followed by cleaning module 8 for removing chips and the like stuck to the workpiece, followed by workpiece unloading module 9. An automatic workpiece transfer machine for conveying the workpiece in order with respect to the modules 2 to 8 that perform the specified processing is set at processing machine line 100. In particular, the automatic workpiece transfer machine of the present embodiment performs conveyance of the workpiece using two conveyance robots, 15A and 15B.

Figure 2:
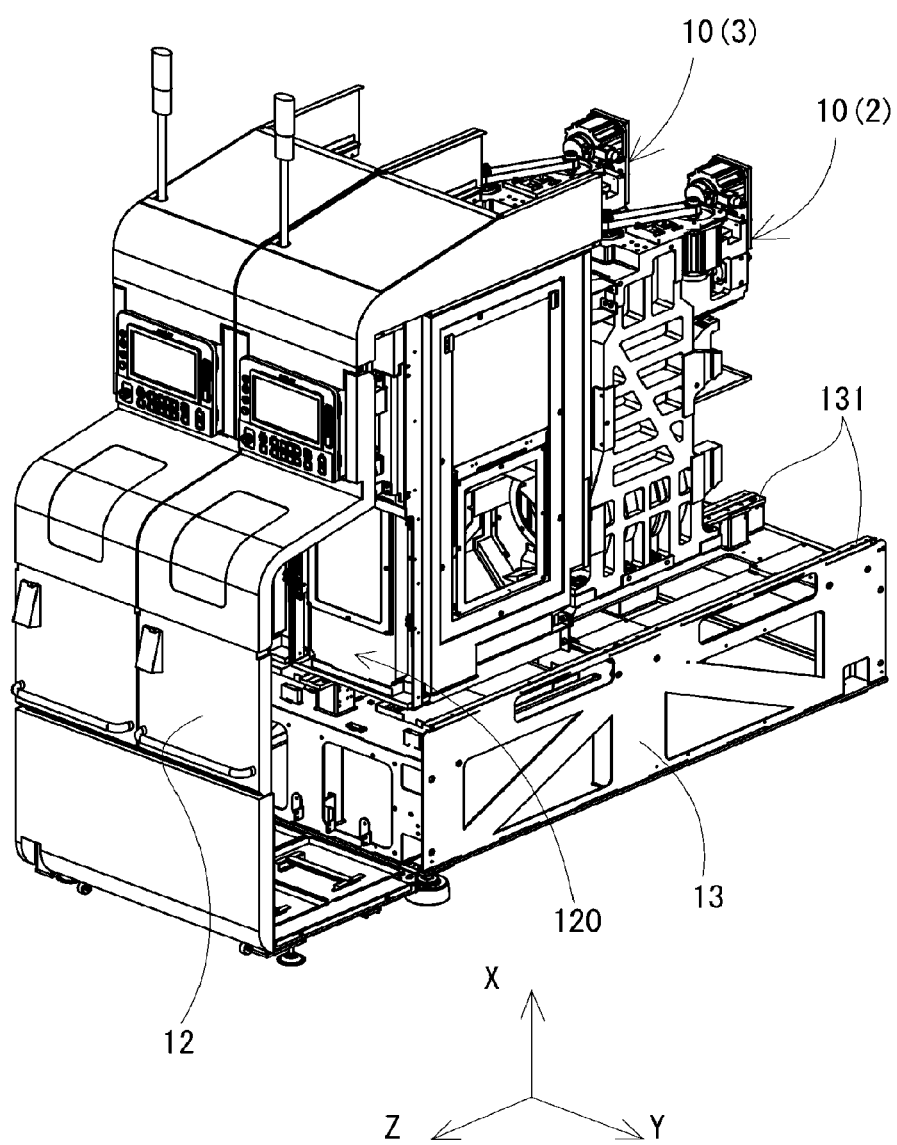
FIG. 2 is a perspective view showing processing modules (lathe modules) and front covers of the processing machine line.

Each of the modules 1 to 9 (hereinafter abbreviated to processing module 10) is covered by main body cover 11, with front cover 12 formed to protrude forward at the front section as shown in FIG. 2. Here, FIG. 2 is a perspective view showing processing modules 10 (in particular, lathe modules 2 and 3) and front covers 12 of processing machine line 100. Processing modules 10 are loaded on base 13 adjacent to each other. Rails 131 are provided on base 13 and each processing module 10 is configured such that a processing main body such as a lathe or a machining center is assembled on a movable bed provided with wheels. Accordingly, processing modules 10 on base 13 are loaded so as to be movable in a front-rear direction on rails 131.

Front cover 12 formed to protrude forwards from processing module 10 forms single conveyance space 120 that is a connected space at a front section of processing machine line 100. Here, in the present embodiment, the machine body front-rear direction of processing module 10 is the Z-axis direction, the main body width direction is the Y-axis direction, and the height direction is the X-axis direction. Accordingly, conveyance space 120 extends in the direction in which the modules 1 to 9 are arranged in the line, that is, the Y-axis direction. Conveyance space 120 is a space in which conveyance robots 15A and 15B move, and the automatic workpiece transfer machine is configured from those conveyance robots 15A and 15B assembled on a front section of each module 1 to 9.

Figure 3:
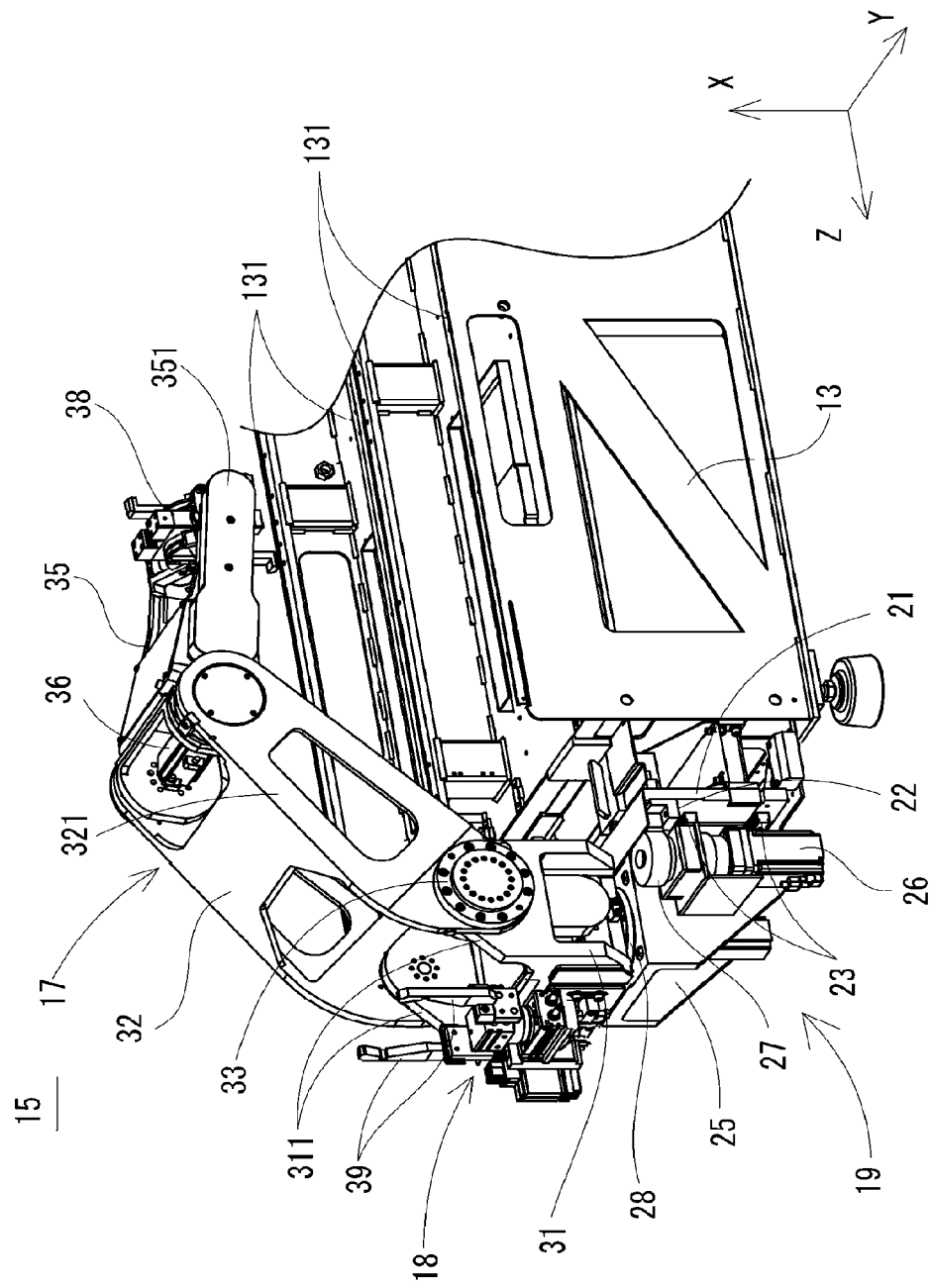
FIG. 3 is a perspective view showing a conveyance robot with a multi-jointed robot arm extended.
Figure 4:
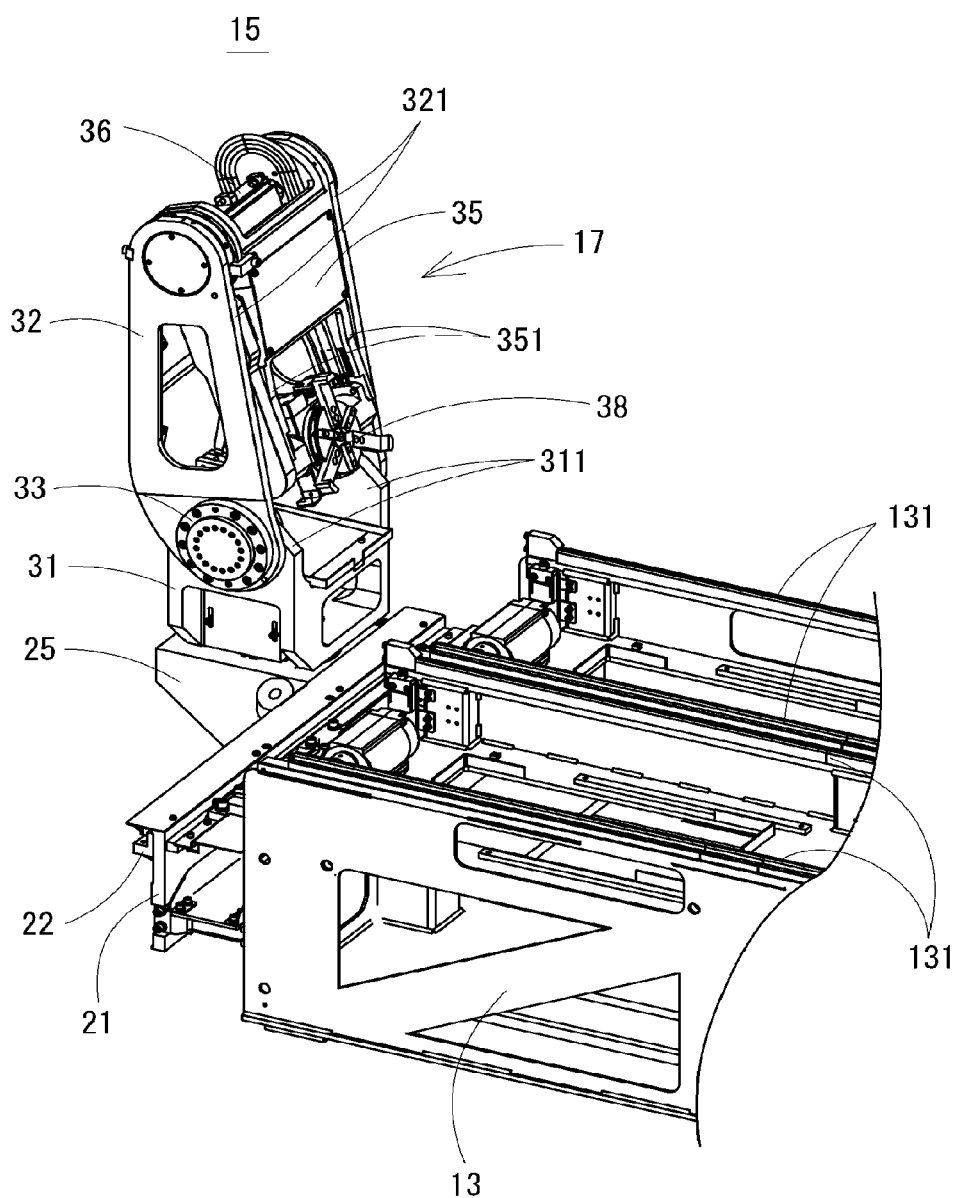
FIG. 4 is a perspective view showing a conveyance robot with a multi-jointed robot arm in a folded state.

FIGS. 3 and 4 are perspective views of conveyance robots 15A and 15B. In particular, FIG. 3 shows multi-jointed robot arm 17 for transferring the workpiece between processing modules 10 in an extended state. Also, FIG. 4 shows multi-jointed robot arm 17 in a folded state for moving in conveyance space 120. Conveyance robot 15 is configured from multi-jointed robot arm 17 that on the one hand can be folded in a compact state in this manner, and on the other hand can extend to perform work at a distant location. Note that, because conveyance robots 15A and 15B have the same configuration, they are both referred to as "conveyance robot 15".

Conveyance robot 15 is configured by traveling device 19 being assembled on base 13, and multi-jointed robot arm 17 being loaded on traveling device 19. Traveling device 19 is configured with support plate 21 fixed to a front surface section of base 13 and rack 22 and two rails 23 arranged fixedly in the Y-axis direction on support plate 21. Also, traveling table 25 provided with a slider is assembled on rails 23 in a slidable manner. Traveling motor 26 is provided on traveling table 25, and pinion 27 fixed to a rotation axis of traveling motor 26 is engaged with rack 22. Thus, traveling motor 26 is driven such that pinion 27 rotates on rack 22, by which traveling table 25 moves along rails 23 in a Y-axis direction on the front surface section of base 13.

Further, multi-jointed robot arm 17 is loaded on traveling table 25 via rotating table 28. Multi-jointed robot arm 17 is configured to transfer a workpiece between processing modules 10 with a narrow width. In other words, multi-jointed robot arm 17 is configured with support table 31 fixed to rotating table 28, with upper arm member 32 connected to rotating table 28 via first joint 33, and front arm member 35 connected to upper arm member 35 via second joint 36. Support table 31 is configured from pair of support plates 311 established in accordance with the width dimension of processing module 10, connected to which via first joint 33 are pair of upper arm plates 321 that configure sides surfaces in the width direction of upper arm member 32.

Multi-jointed robot arm 17 is configured such that front arm member 35 fits inside upper arm member 32. Front arm member 35 is provided with pair of parallel front arm plates 351 on the left and right sides, with front arm plates 351 being connected to upper arm plate sections 321 via second joint 35. Accordingly, with multi-jointed robot arm 17, the angle of upper arm member 32 is adjusted by driving first joint 33, and the angle of front arm member with respect to upper arm member 32 is adjusted by driving of second joint 36. Further, multi-jointed robot arm 17 is equipped with robot hand 38 provided with a clamp mechanism on front arm member 35. Robot hand 38 is attached to front arm plates 351 via a shaft receiving member to be rotatable, and the angle is adjusted by the driving of a hand motor.

Further, with conveyance robot 15, inverting device 18 for inverting a workpiece is loaded on traveling table 25. Inverting device 18 is assembled next to support table 31 of multi-jointed robot arm 17 fixed on rotation table 28. Inverting device 18 is configured to be able to grip a workpiece by pair of gripping claws 39 being opened and closed by a gripping cylinder. Also, a rotating actuator that causes rotation using compressed air as a working fluid is provided on inverting device 18, and is able to rotate a workpiece held by gripping claws 39 by 180 degrees in a horizontal plane.

Working of the present embodiment is described next. With processing machine line 100, a workpiece is removed from workpiece loading module 1 by conveyance robot 15A and conveyed in order from modules 2 to 9 starting with lathe module 2. Here, during conveyance, the workpiece is switched from conveyance robot 15A to conveyance robot 15B. With conveyance robots 15, pinion 27 rotated by the driving of traveling motor 26 moves rack 22, such that traveling table 25 moves in the Y-axis direction in front of modules 2 to 8. During movement of traveling table 25, multi-jointed robot arm 17 loaded on traveling table 25 is in the folded state shown in FIG. 4.

Then, conveyance robot 15 stopped in front of a specified processing module 10 performs transfer of the workpiece between processing modules 10. The transferring of the workpiece is performed by multi-jointed robot arm 17 changing from the folded state in FIG. 4 to the extended state in FIG. 3. Next, robot hand 38 is rotated by the driving of the hand motor to adjust the angle of robot hand 38, and gripping and releasing of the workpiece is performed by chuck claws of a clamp mechanism being moved in a diameter direction by the supply or ejection of hydraulic fluid.

However, in a case in which two-sided processing is performed on the workpiece in lathe modules 2 and 3, in the present embodiment, inverting of the work is performed during conveyance. In other words, multi-jointed robot arm 17 that has taken the workpiece from lathe module 2 transfers the workpiece to inverting device 18. Transfer of the workpiece between multi-jointed robot arm 17 and inverting device 18 is performed by robot hand 36 of multi-jointed robot arm 35 in a folded state passing through pair of support plates 311. With inverting device 18, pair of left and right gripping claws 39 are opened and closed by the driving of a gripping cylinder such that the workpiece is removed from robot hand 36. Then, gripping claws 39 are rotated 180 degrees by the driving of a rotation actuator to invert the direction of the workpiece. Next, multi-jointed robot arm 17 removes the workpiece again and robot hand 38 performs re-gripping of the workpiece from the opposite surface to that of the previous process.

Further, in the present embodiment, transfer of the workpiece between conveyance robots 15A and 15B is performed using inverting device 18. Conveyance of a workpiece between the multiple types of modules 1 to 9 is performed with conveyance robot 15A handling the first half and conveyance robot 15B handling the second half. Thus, conveyance of a workpiece switches from conveyance robot 15A to conveyance robot 15B within processing machine line 100. With respect to this point, for a conventional processing machine line provided with modules 1 to 9 the same as the present embodiment, for example, after measurement module 4 or machining center module 5, a workpiece loading table module is provided for each of measurement module 4 and machining center module 5. The workpiece loading table module may be a temporary location used for transferring a workpiece or a temporary location for a quality check, and is the same size as processing module 10 (for example, lathe modules 2 and 3).

Figure 5:
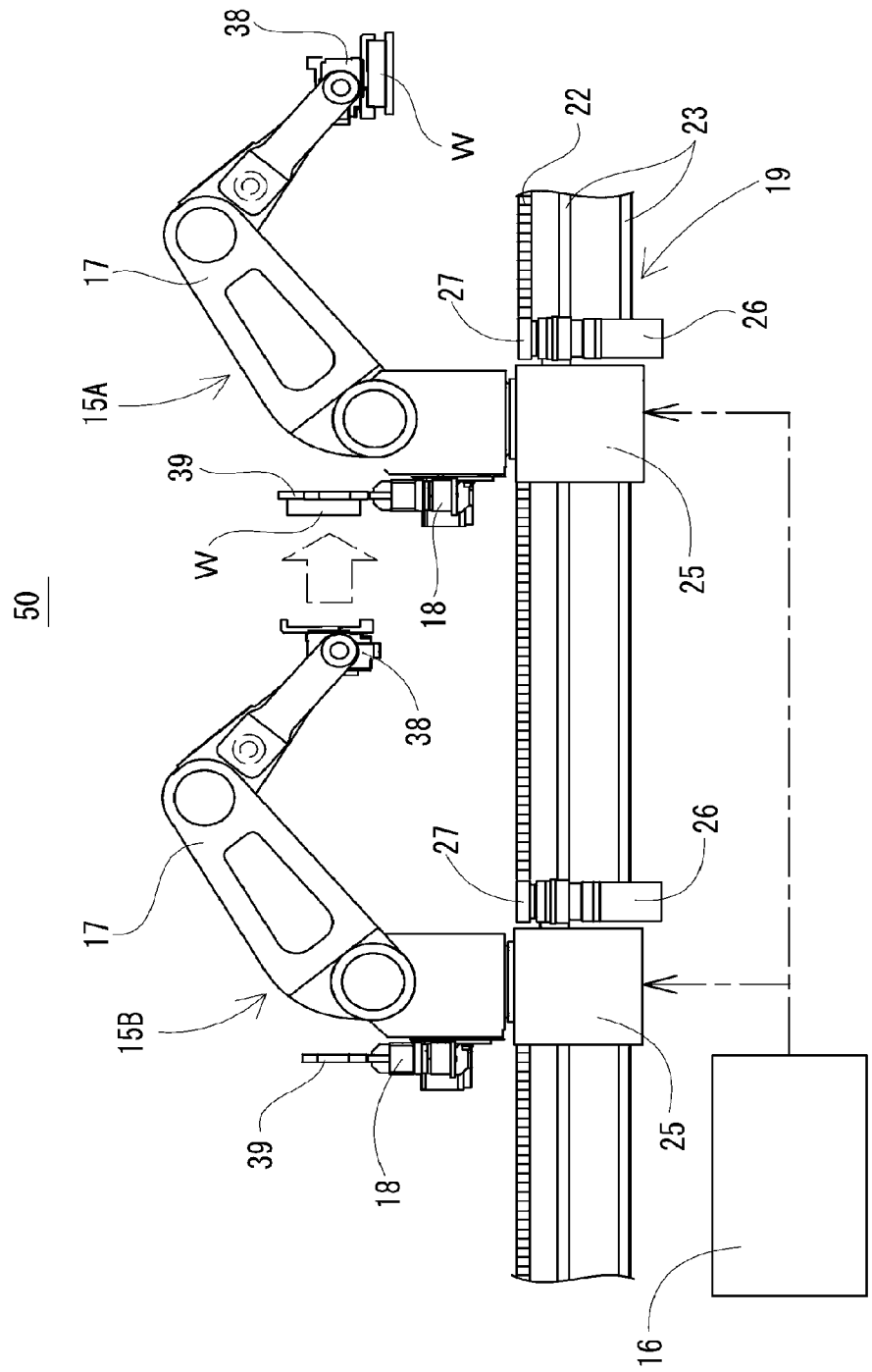
FIG. 5 illustrates the automatic workpiece transfer machine performing transfer of a workpiece between adjacent conveyance robots.

However, there is no workpiece loading table module in processing machine line 100. An automatic workpiece transfer machine of the present embodiment is configured to perform transfer of a workpiece from conveyance robot 15A to conveyance robot 15B directly. Here, FIG. 5 illustrates the automatic workpiece transfer machine performing transfer of a workpiece from conveyance robot 15A to conveyance robot 15B. As shown in the figure, conveyance control device 16 that performs drive control of conveyance robots 15A and 15B is provided in automatic workpiece transfer machine 50. Conveyance control device 16 is a controller that controls conveyance devices 15A and 15B, and is provided with a calculating processing device, a memory device, and the like. In particular, a workpiece transfer control section is provided in the memory device, in which is stored a workpiece conveyance program for driving conveyance robots 15A and 15B in accordance with the processing job of workpiece W.

Processing machine line 100 performs workpiece machining processing and measurement processing by dividing processing into seven steps in modules 2 to 8. A drive control device is provided on each of the modules 2 to 8, these devices storing processing programs for performing processing of each relevant process. Here, because the processing time for the machining processing, measurement processing, and the like performed at modules 2 to 8 differs, the workpiece conveyance program stored in conveyance control device 16 is configured with a conveyance schedule that is efficient with a short cycle time. In particular, with respect to transfer of workpiece W between conveyance robots 15A and 15B, in the case of the present embodiment, settings are specified such that transfer is performed during workpiece loading.

Also, workpiece W transferred from conveyance robot 15A to conveyance robot 15B is performed for a workpiece for which, for example, dimension accuracy processing has been completed. Here, conveyance robot 15A that removed workpiece W from measurement module 4 transfers the workpiece W from robot hand 38 of multi-jointed robot arm 17 to inverting device 18. With inverting device 18, gripping claws 39 are rotated 180 degrees such that the direction of workpiece W is inverted. Then, conveyance robot 15A moves to workpiece loading module 1 while still holding workpiece W in inverting device 18 and removes a new workpiece W.

During this process, conveyance robot 15A operates such that multi-jointed robot arm 17 faces towards workpiece loading module 1 by the rotation of rotating table 28, and inverting device 18 on the rear side faces conveyance robot 15B. Therefore, conveyance robot 15B is able to remove the workpiece W being processed from conveyance robot 15A while the new workpiece W is being removed. In other words, conveyance robot 15B moves close to conveyance robot 15A, changes direction by the rotation of rotating table 28, extends multi-jointed robot arm 17, and uses robot hand 38 at the end of multi-jointed robot arm 17 to remove the workpiece W from inverting device 18 of conveyance robot 15A.

Thus, according to the present embodiment, a workpiece is held by inverting device 18 of conveyance robot 15A, then conveyance robot 15B removes the workpiece at a specified time, therefore, it is not necessary to synchronize movements when performing transfer of the workpiece W between the robot hands 38, thereby transfer of the workpiece W is performed efficiently. For example, as described above, because conveyance robot 15B removes workpiece W held by inverting device 18 during workpiece loading performed by multi-jointed robot arm 17 of conveyance robot 15A, there is no wasted movement by conveyance robot 15A. This contributes to reducing the cycle time. However, transfer of workpiece W is not limited to during workpiece loading, it may be performed at a central portion of processing by processing machine line 100.

Also, an automatic workpiece transfer machine of the present embodiment performs direct transfer of a workpiece from conveyance robot 15A to conveyance robot 15B, therefore, unlike a conventional processing machine line, it is not necessary to provide a workpiece loading table module, so the overall line length is shorter. In particular, as the quantity of processing modules 10 and conveyance modules 15 becomes larger as the quantity of processes increases, the quantity of workpiece loading tables must also be increased. With respect to this point, an automatic workpiece transfer machine of the present embodiment enables a processing machine line configuration without any waste configured from a minimum required quantity of processing modules 10 without the need for a workpiece loading table module.

Also, because inverting device 18 is used for transferring a workpiece between conveyance robots 15, it is possible to perform transfer after reversing the processing surface by inverting the workpiece W before transfer. However, transfer to conveyance robot 15B may be performed without inverting workpiece W in a case in which the processing surface is to be switched. Also, when conveyance robot 15A is holding a workpiece W in inverting device 18, it is not required to immediately transfer the workpiece W to conveyance robot 15B, conveyance robot 15A may hold the workpiece W and continue with conveyance work of another workpiece W, such that inverting device 18 performs the role of a workpiece temporary loading table.

When inverting device 18 is used as a temporary loading table, it is possible to perform a quality check on the workpiece W during processing. With processing machine line 100, for example, an operator may perform a quality check for one workpiece W per several tens of workpieces W. In this case, conveyance robot 15A or 15B may be stopped in front of a specified processing module 10 by an operator pressing a sample check button on the operation panel. Then, the operator may open front cover 12 and remove the workpiece W from inverting device 18, perform a quality check, and return the workpiece W to inverting device 18. In particular, with the present embodiment, because it is possible to stop conveyance robots 15A and 15B at a selected position after a given process is complete, the workpiece W is not removed from a temporary loading table at a fixed position, it is possible to perform a quality check on workpiece W at every stage. Also, when a quality check is being performed at one of the conveyance robots 15, work can continue at the other conveyance robot 15.

The above describes an embodiment of the present disclosure, but embodiments are not limited to these and various changes may be employed without departing from the scope of the disclosure. For example, in an embodiment above, the processing machine line is configured from nine processing modules 10, but may be configured from a greater number of processing modules 10, in which case the automatic workpiece transfer machine will be configured from three or more conveyance robots 15.

REFERENCE SIGNS LIST

1: workpiece loading module; 2, 3: lathe module; 4: measurement module; 5: machining center module; 6: hob module; 7: burr module; 8: cleaning module; 9: workpiece unloading module; 10: processing module; 15 (15A, 15B): conveyance robot; 16: conveyance control device; 17: multi-jointed robot arm; 19: traveling device; 18: inverting device; 38: robot hand; 50: automatic workpiece transport machine; 100: processing machine line; W: work

The invention claimed is:

1. An automatic workpiece transfer machine comprising:
   multiple conveyance robots configured to convey a workpiece with respect to multiple processing sections, the conveyance robots each including
      a transfer device configured to perform transfer of the workpiece between the processing sections,
      a traveling device configured to move the transfer device that is loaded on a traveling table with respect to the processing sections, and
      a workpiece holding device loaded on the traveling table and configured to hold the workpiece received from the transfer device; and
   a control device configured to control driving of the conveyance robots, the control device including a workpiece transfer control section configured to, with respect to two adjacent of the conveyance robots, perform transfer of the workpiece directly between the transfer device of one of the two adjacent conveyance robots and the workpiece holding device of the other of the two adjacent conveyance robots.

2. The automatic workpiece transfer machine according to claim 1, wherein
   the workpiece holding device is provided with an inverting mechanism configured to invert the workpiece that is held.

3. The automatic workpiece transfer machine according to claim 1, wherein
   the transfer device is a multi jointed robot arm provided with a robot hand assembled to a pair of support members that are established on a rotating table at a specified interval, and is configured to transfer the workpiece with the workpiece holding device attached to the rotating table via the pair of support members.

4. The automatic workpiece transfer machine according to claim 3, wherein
   the workpiece transfer control section of the control device is configured to perform transfer of the workpiece between a first conveyance robot of the conveyance robots positioned at a downstream side and a second conveyance robot of the conveyance robots positioned at an upstream side when the second conveyance robot is rotated to the upstream side.

5. The automatic workpiece transfer machine according to claim 1, wherein
   the workpiece holding device includes a pair of gripping claws that grip the workpiece, the gripping claws being configured to rotate and invert the workpiece.

* * * * *